(12) United States Patent
Biester et al.

(10) Patent No.: US 8,264,370 B2
(45) Date of Patent: Sep. 11, 2012

(54) POWER AND SIGNAL DISTRIBUTION SYSTEM

(75) Inventors: Klaus Biester, Wienhausen (DE); Norbert Lenz, Celle (DE); Peter Kunow, Berlin (DE); Steffen Gebauer, Langenhagen (DE); Martin Trog, Celle (DE); Volker Zabe, Burgdorf (DE)

(73) Assignee: Cameron International Corporation, Houston, TX (US)

( * ) Notice: Subject to any disclaimer, the term of this patent is extended or adjusted under 35 U.S.C. 154(b) by 467 days.

(21) Appl. No.: 12/601,740

(22) PCT Filed: May 30, 2007

(86) PCT No.: PCT/EP2007/004793
§ 371 (c)(1),
(2), (4) Date: Nov. 24, 2009

(87) PCT Pub. No.: WO2008/145160
PCT Pub. Date: Dec. 4, 2008

(65) Prior Publication Data
US 2010/0289668 A1    Nov. 18, 2010

(51) Int. Cl.
*G01V 3/00*    (2006.01)

(52) U.S. Cl. ...... 340/854.9; 307/151; 307/3; 340/854.6; 340/646; 340/663; 340/539.2; 340/538.16; 333/132; 370/489; 370/490

(58) Field of Classification Search ............... 340/854.6, 340/853.2, 854.5, 538.12, 538.16, 539.22, 340/646, 663, 539.1; 307/151; 333/132; 370/489, 490; 324/530
See application file for complete search history.

(56) References Cited

U.S. PATENT DOCUMENTS

| | | | |
|---|---|---|---|
| 3,659,280 A * | 4/1972 | Donohoo | 340/538.12 |
| 7,609,158 B2 * | 10/2009 | Banting et al. | 340/539.22 |
| 7,675,427 B2 * | 3/2010 | Deaver et al. | 340/661 |
| 7,701,357 B2 * | 4/2010 | Deaver et al. | 340/646 |
| 7,795,877 B2 * | 9/2010 | Radtke et al. | 324/530 |
| 7,804,280 B2 * | 9/2010 | Deaver et al. | 323/210 |
| 7,965,193 B2 * | 6/2011 | Deaver et al. | 340/646 |
| 2003/0098799 A1 | 5/2003 | Zimmerman | |

FOREIGN PATENT DOCUMENTS

WO    WO02098013    12/2002

OTHER PUBLICATIONS

International Search Report for Appl. No. PCT/EP2007/004793 dated Aug. 20, 2007 (2 p.).

* cited by examiner

*Primary Examiner* — Lam T Mai
(74) *Attorney, Agent, or Firm* — Chamberlain Hrdlicka

(57) ABSTRACT

A power and signal distribution system comprises a converter unit connected to a plurality of control units. The converter unit and the control units are arranged in areas difficult to access, for instance on the sea bed. The converter unit is connected to a remote monitoring and supplying device via at least one cable connection. Each control unit has assigned thereto at least one production apparatus for crude oil or natural gas corresponding gate valves, chokes, biops, actuators.
In some embodiments, the power and signal distribution system the converter unit comprises a data separation device and a voltage converter. The converted voltage from the voltage converter is transmitted together with data/signals from the converter unit to at least one of the control units.

20 Claims, 4 Drawing Sheets

POWER AND SIGNAL DISTRIBUTION SYSTEM

CROSS-REFERENCE TO RELATED APPLICATION

The present application claims priority to PCT/EP2007/004793 filed 30 May 2007 hereby incorporated herein by reference.

STATEMENT REGARDING FEDERALLY SPONSORED RESEARCH OR DEVELOPMENT

Not Applicable.

BACKGROUND OF THE INVENTION

The present invention relates to a power and signal distribution system comprising a plurality of converter and control units which are particularly arranged in areas difficult to access, for instance on the seabed. At least one control unit is connected to at least one converter unit for transmitting power and data/signals. The converter unit is connected to a remote monitoring and supplying device via at least one cable connection. Each of the control units has assigned thereto on site at least one production tree for crude oil or natural gas with corresponding means. Such means are for instance gate valves, chokes, actuators, or the like.

The corresponding monitoring and supplying device is normally arranged onshore or above sea level. This device transmits power and signals or data via the corresponding cable connection to the converter unit. The power is here adapted as a rule, particularly with respect to voltage and power supply for each of the control units. Such a conversion includes, for instance, a transformation of the voltage to other values and/or to other kinds of voltage.

The corresponding control unit is connected to the converter unit also for the transmission of power and data/signals. Known are such power and signal distribution systems from practice where only one respective control unit is assigned to a converter unit and connected thereto accordingly.

Likewise, one production tree can also only be fed and monitored by the corresponding control unit.

SUMMARY OF THE PREFERRED EMBODIMENTS

The present invention improves such a power and signal distribution system such that also several production places can be fed at a large distance in a simple constructional way and without any major modifications of formerly used units.

The advantages are achieved by the features of patent claim 1, for example.

According to the invention a plurality of control units are connected to a converter unit each for transmitting power and data/signals. Likewise, several production apparatuses can also be fed and controlled through only one converter unit via the corresponding control units.

The corresponding converter unit comprises at least one data separation device by which the data received via the cable connection can be separated from the power supplied for the respective control units. At the same time the voltage is converted by the voltage converter of the converter unit and the converted voltage is then transmitted to each of the control units together with the data/signals assigned to each control unit.

This considerably reduces the whole installation efforts, and the adaptation of already known control and converter units is relatively easy for connecting a plurality of control units with one converter unit only.

In a first advantageous assembly, the control units may be connected one after the other relative to the converter unit for the supply of power and via a data bus connection for communication. The corresponding connection devices are here looped through from one control unit to the other one at least up to the last control unit of said chain.

It is here possible that, both in the cable connection to the converter unit and in the connections from said unit to the individual control units, power supply and data bus connection are integrated in one cable.

In particular, each control unit is addressable via the corresponding data bus connection, and groupwise addressing is also feasible if for instance like data or signals are transmitted to the group of control units.

To be able to address the control units individually, they comprise corresponding addresses. These addresses can be fixedly predetermined or also distributed dynamically in the system.

To be able to bridge a corresponding distance relative to the monitoring and supplying device, a voltage supply with a few kV is carried out. In this instance the voltage supply may e.g. amount up to 10 kV. This permits lengths for the corresponding cable connection of several hundred kilometers.

The individual control units and the devices connected to said units on the corresponding production apparatus require lower voltages, and these are produced by the corresponding voltage converter of the converter unit and normally amount to a few 100 V and e.g. particularly to about 300 V.

The corresponding data bus connection can be configured in various ways, a field bus, such as a Can bus, being one example. Such a Can bus serves in line structure to feed a plurality of successively arranged control units. The maximum number of participants, i.e. the number of the corresponding control units, depends on the corresponding addressability of the field bus. In one example, 128 addresses are for instance addressable by means of a Can bus. About 30 to 40 addresses are normally addressed per control unit, so that in the corresponding line structure at least three control units can be operated.

The distance between the various control units may amount to several kilometers, the corresponding distance depending on the data amount to be transmitted. If the data amount to be transmitted is a few kbits, this will e.g. result in distances up to five or more kilometers, whereas with larger data amounts smaller distances are feasible.

Since failure of a corresponding control unit entails high costs for the operator of the corresponding power and signal distribution system, at least the control units are redundantly arranged in at least two groups. This may also be applicable to the converter unit.

It is here possible that two groups of control units are each time connected to a converter unit or also each group to a converter unit, wherein one converter unit and one group is active at a time.

In particular, the cable connection from the monitoring and supplying device to each converter unit may be a coaxial cable connection. This includes the power connection and data/signal connection accordingly.

It is also possible that the corresponding control units are not connected one after the other, but that they are connected in parallel with the corresponding converter unit. Combinations of parallel and serial arrangements are also possible.

To be able to distribute the data and signals accordingly in a parallel arrangement of the control units, it is of advantage if every converter unit comprises a router for the distribution of the data/signals to the respective control units. The connection between converter unit and control unit can further be established via a corresponding data bus connection, such as field bus, or the like.

Thanks to the distribution by means of the router, a correspondingly greater number of control units are connectable, for instance 8, 9, 10, or even more. The router may be configured as a so-called backbone or also software router.

It is also possible to build up the cable connection separately from a number of power cable connections and signal cable connections. The individual cable connections may here for instance be configured as a coaxial cable.

The signal cable connection may e.g. be a fiber cable for transmitting a large volume of data; corresponding fibers may here be formed from glass or plastics.

If the corresponding data are transmitted via such a fiber cable, it is of advantage if a fiber optic modem is assigned to the router. This modem converts the optically transmitted data into corresponding electrical signals, which can then be distributed by the router among the various control units.

It is also possible that power is not directly supplied by the monitoring and supplying device, but that e.g. a voltage supply device is used that is already present on site. To this end the converter unit may comprise a power-feeding device for such an additional voltage supply.

To be able to adjust the power or energy transmitted to the various control units in an appropriate manner and to avoid overloading by the power supply of the converter unit at the same time, said converter might comprise a power controller.

Furthermore, it may be of advantage if an EMC, electromagnetic compatibility module is assigned to router, modem and/or power controller. Such a module prevents overvoltages or undervoltages that might possibly destroy the partly sensitive electrical means in the converter unit or also the subsequent control units.

Furthermore, it is possible that the corresponding fiber cable is composed of a plurality of single fiber cables, so that for instance several single fiber cables are guided through a corresponding data or signal cable, so that it is for instance possible to feed a number of control units that is ten times greater. This applies by analogy to the power supply as well.

To be able to transmit corresponding power and data/signals to the converter unit separately in such a cable connection, the cable connection may comprise a cable converter with individual connectors for every single fiber cable and every power cable connection.

To compensate for the failure of one or more cables of such type in a simple way, at least some substitute single fiber cables or also substitute power cables may be provided in the cable connection.

BRIEF DESCRIPTION OF THE DRAWINGS

The invention will now be explained in more detail with reference to the figures attached in the drawing, of which.

DETAILED DESCRIPTION OF THE PREFERRED EMBODIMENTS

Figure 1:
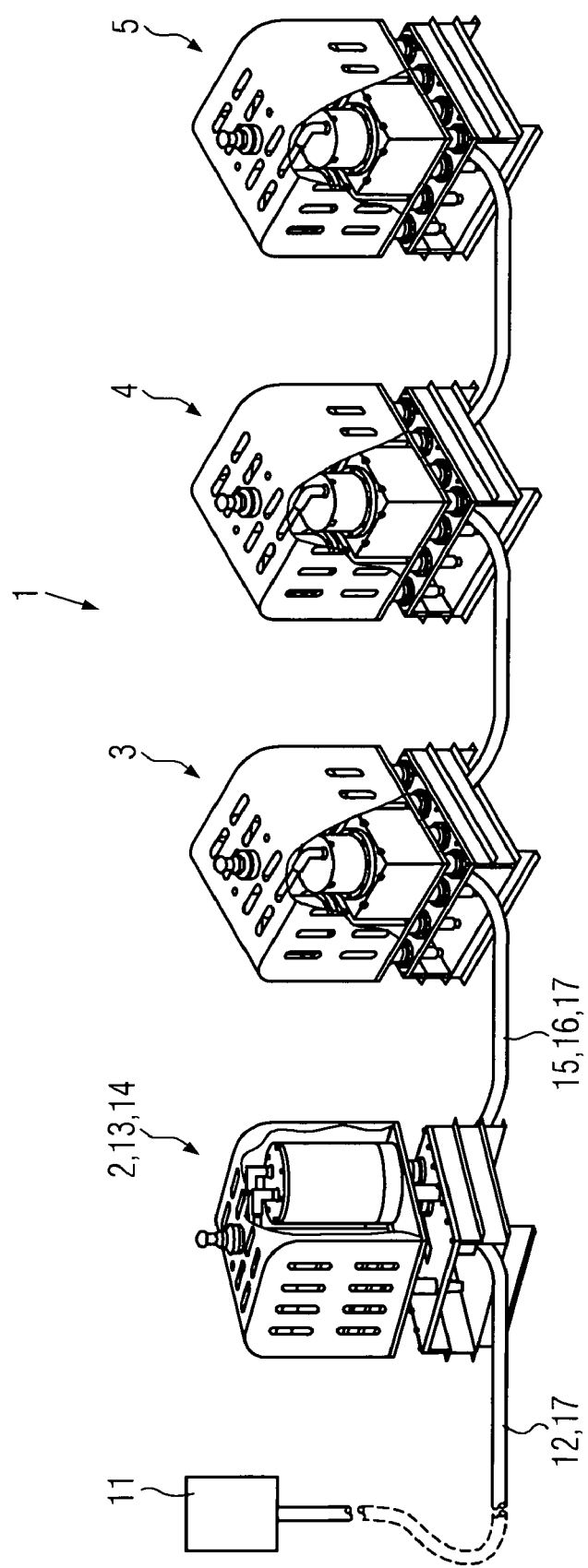
FIG. 1 is a view of a power and signal distribution system according to a first embodiment of the invention with a converter unit and three control units arranged one after the other.

FIG. 1 shows three control units 3, 4 and 5 arranged one after the other in series, which are connected via a cable connection 17 to one another and to a converter unit 2. The converter unit 2 is arranged in an area difficult to access, for instance on the seabed. It is for example connected via a coaxial cable 12 to a monitoring and supplying device 11 that is e.g. arranged on the seabed together with a converter unit 2. The distance to be covered via the cable connection 12 may amount up to several 100 kilometers. For the power supply of the converter unit 2 there is a voltage supply with a few 1000 V d.c. voltage. This d.c. voltage supply is transformed by a voltage converter 14 arranged in the converter unit 2 into supply voltages suited for the corresponding control units 3, 4 and 5, for instance d.c. voltages in the order of a few 100 V, particularly about 300 V.

At the same time, the corresponding data or signals are picked up in the converter unit 2 by means of a corresponding data separation device 13 and transmitted via the cable 17 to the downstream control units 3, 4, and 5. The corresponding data or signals are selectively assigned to the corresponding control unit, a data bus connection, such as a field bus and particularly a CAN bus 16, being used for transmitting the data or signals. As a rule, up to 128 addresses can be addressed via this field or CAN bus 16, so that up to three or four control units can be addressed via a converter unit in the case of 30 to 40 addresses per control unit 3, 4, and 5. The distance between control unit 3 and converter unit 2 and also the distance of the further control units 4 and 5 depends on the data transmission rate used by means of the field or CAN bus. At low data transmission rates correspondingly large line lengths are possible, whereas these are smaller at higher data transmission rates.

It is also possible to transmit specific data or signals to all control units 3, 4, 5, if these serve, for instance, the group control of said control units.

Figure 2:
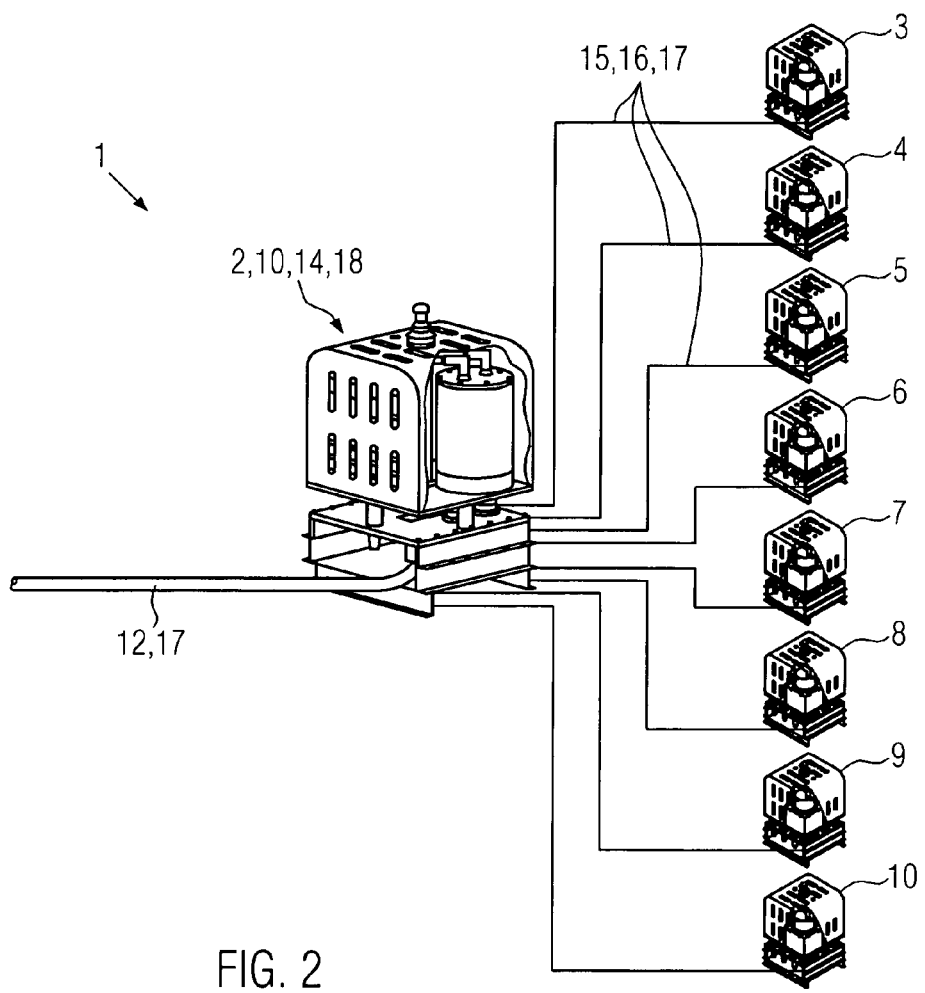
FIG. 2 is a view by analogy with FIG. 1 with eight control units arranged in parallel.

FIG. 2 shows a further embodiment of a power and signal distribution system 1 according to the invention. In this system, eight control units 3 to 10 are connected in parallel with a converter unit 2. The connection between control units and converter unit is established by analogy with FIG. 1, with a corresponding connection being provided between each control unit 3 to 10 and the converter unit 2 in the form of a cable 17, in particular, for voltage and signal supply.

To be able to distribute the corresponding signals and/or data in the embodiment according to FIG. 2, the converter unit 2 comprises a so-called router 18. Said router substantially forms some kind of distributing device which forwards incoming data or signals to specific target networks, or in the present case to control units, this process being called routing. Moreover, the cable connection 12 in FIG. 2 is built up by analogy with FIG. 1 and the values regarding voltage, distance, or the like, are also like those of FIG. 1.

It should additionally be noted that like parts are provided in all figures with like reference numerals and are explained in more detail only in part in connection with one figure.

Figure 3:
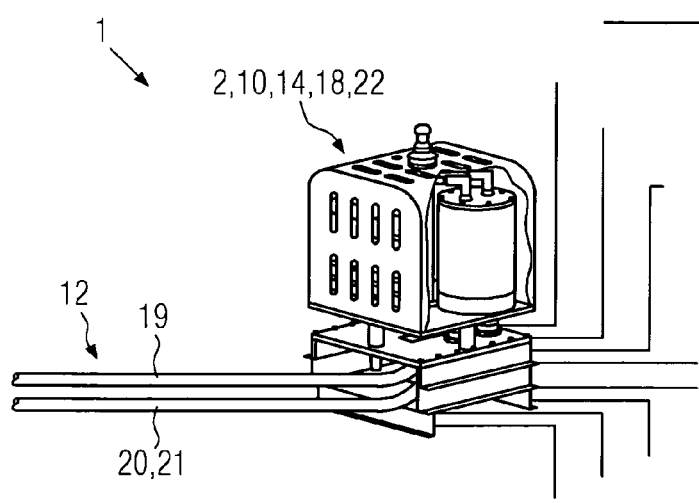
FIG. 3 is a view by analogy with FIG. 2 with two separate feed lines leading to the converter unit.

FIG. 3 shows a further embodiment of a power and signal distribution system 1 of the invention. This system differs from the system according to FIG. 2, particularly in the way how the data or signals are forwarded. In FIG. 3, a separate cable connection 20 is provided for signal transmission, said cable connection 20 together with the power cable connection 19 forming the corresponding cable connection 12 to the monitoring and supplying device 1. The signal cable connection 20 is designed as a fiber cable 21, see also FIG. 5. The values for voltage, distance, or the like, correspond again to those of FIGS. 1 and 2.

In FIG. 3, the corresponding control units 3 to 10 are not shown for the sake of simplicity. It should additionally be noted that corresponding fiber cables 21 may be braided with power cable connection 19 to form the cable connection 12, wherein for instance ten power cables 19 and a corresponding number of ten signal cable connections 20 may be provided. The number of control units 3 to 10 which can be fed by a converter unit 2 is substantially only determined by the capacity of the converter unit, so that for example, eight, nine, ten or more control units can be supplied by only one converter unit 2 with energy/power and data/signals.

For instance, to explore an oil field with a number of converter units that is as small as possible, such a converter unit may be arranged approximately in the center of the oil field, the corresponding monitoring and supplying devices 11 being possibly arranged several 100 kilometers away from said place. In star-shaped configuration with the converter unit 2 the corresponding control units 3 to 10 can then be arranged relative to the converter unit and distributed over the oil field for exploring substantially the whole oil field.

In the former described embodiments the power supply has also been carried out via cable connection 12.

Figure 4:
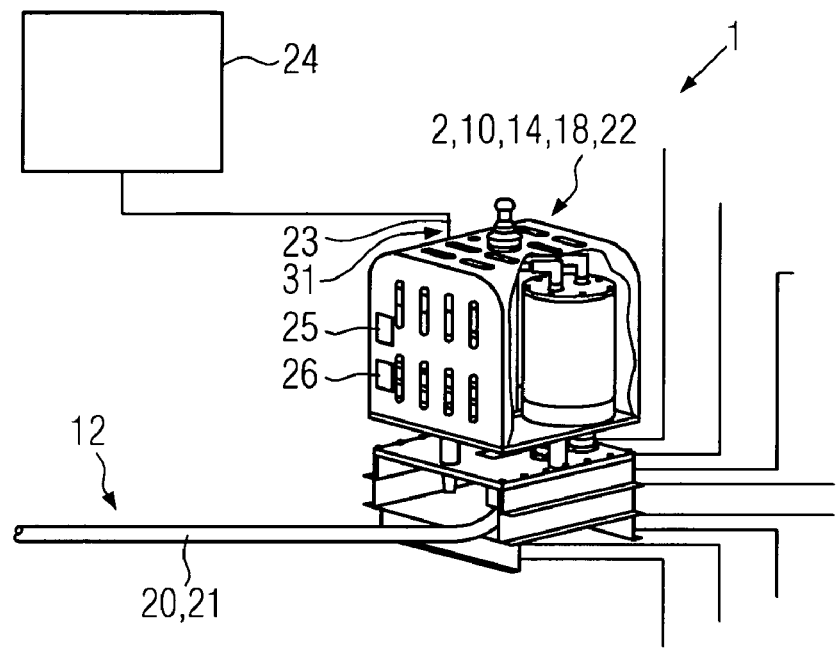
FIG. 4 is a view by analogy with FIG. 2 with an additional feeding device for a converter unit.

In the embodiment according to FIG. 4, only the data/signal transmission is essentially carried out from the side of the monitoring and supplying device 11 (see fiber cable 21) whereas a separate voltage supply device 24 is used for voltage supply. This separate voltage supply device 24 may already be used on site for instance to feed other devices such as pumps or the like. If this separate voltage supply device 24 is adequately designed for the supply of the corresponding components, it can also be used for the additional supply of the converter unit 2. The remaining connections between converter unit 2 and control units 3 to 10 are again by analogy particularly with FIGS. 2 and 3. It should here also be noted that it is also possible to replace one of the control units 3 to 10 according to FIG. 2, or also a plurality of said control units, by a group of control units that are arranged one after the other according to FIG. 1.

In the embodiment shown in FIG. 4, attention must be paid that due to the design of the corresponding separate voltage supply device 24 and the supply of other components, for instance in the oil field, additional safety measures have to be taken for the power and signal distribution system 1 according to the invention. These safety measures refer, for instance, to the arrangement of a power controller 31 in or on the converter unit 2. This power controller monitors the voltage transmitted to the converter unit 2 via power feeding 23 from the separate voltage supply device 24 and controls the voltage to assume values needed by the converter unit 2.

Furthermore, to prevent possible damage by overvoltages or undervoltages, an EMC module 26 may additionally be assigned to the converter unit 2. Such a module serves here to suppress power-induced failures.

In the embodiments shown in FIGS. 3 and 4, attention must further be paid that, apart from a router 18, the converter unit 2 comprises a fiber optic modem 22. Said modem serves to convert the data or signals transmitted via the corresponding fiber cable 21 into electrical data or signals and to transmit them (see also the observation regarding FIG. 1) via a cable and a corresponding field bus to the connected control units 3 to 10.

Figure 5:
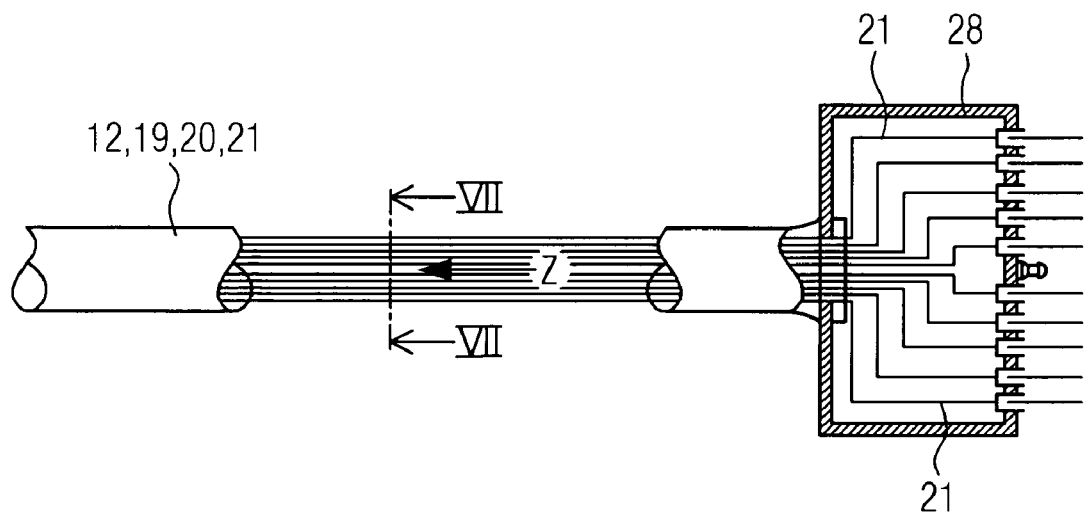
FIG. 5 is a view of a cable connection with cable connector.

FIG. 5 is an enlarged view of a corresponding cable connection 12 with a fiber cable 21 as a signal cable connection 20. A corresponding cable connector 28 is arranged at the end of the cable connection 12 assigned to the converter unit 2. The various fiber cables 21 and thus also power cable connections 19 are connectable by said connector also below sea level to a corresponding plug of the converter unit 2.

Figure 6:
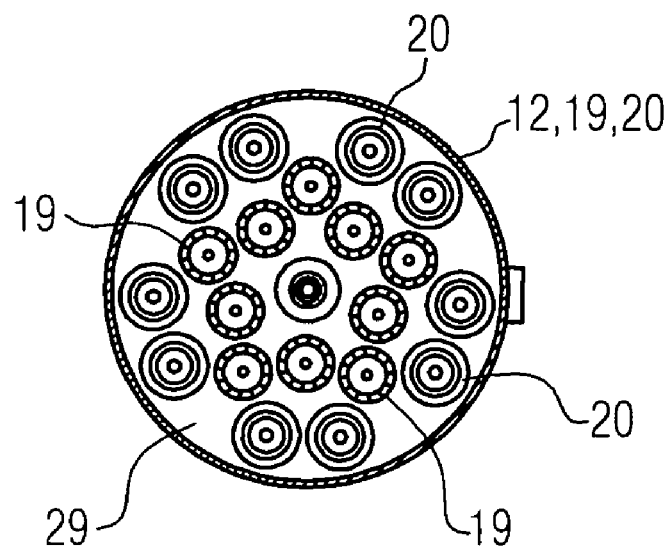
FIG. 6 is a lateral top view on the cable connector.

A corresponding side view of the cable connector 28 from the right side in FIG. 5 is shown in FIG. 6. To be more specific, ten power cable connections 19 and thus ten signal cable connections 20 in the form of fiber cables 21 and the associated connectors, respectively, can be seen in said figure. These are connected with a corresponding mating connector to the converter unit 2.

Figure 7:
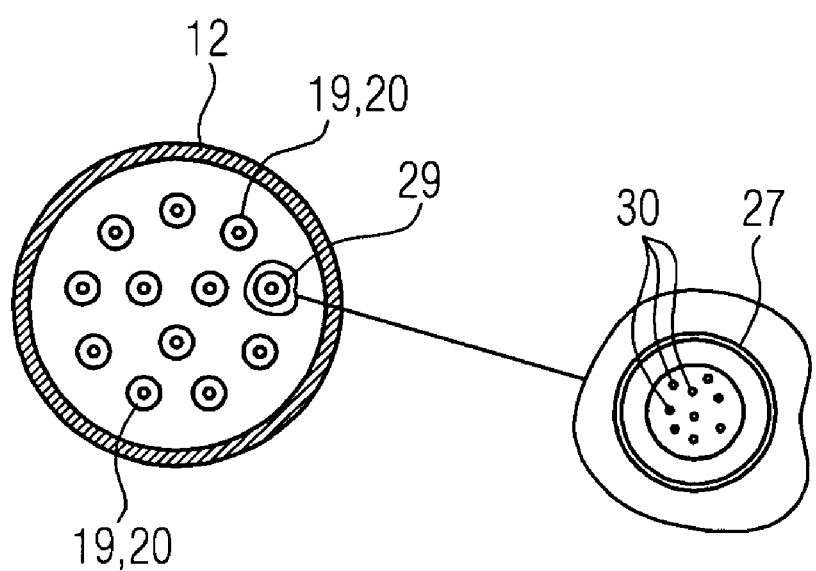
FIG. 7 is a section taken along line VII-VII of FIG. 5.

FIG. 7 shows a section taken along line VII-VII of FIG. 5. As can be seen, a total of twelve power cable/signal cable connections 19, 20 are provided, said structure being also analogously applicable to a fiber cable 21, see FIGS. 3 and 4, on condition that according to FIG. 4 no voltage supply takes place through the corresponding cable connection 12.

According to FIG. 7, however, a voltage and signal transmission takes place through each of the individual cables shown in sectional view because the corresponding power cable connections 19 and signal cable connections 20 are combined to form said individual cables. Ten of said individual cables are used for corresponding control units 3 to 10 while two of said individual cables are configured as substitute lines 29. In the absence of any voltage supply, see FIG. 4, the corresponding individual cables only comprise signal cable connections in the form of fiber cables 21.

The ends of the individual cables according to FIG. 7 are then separated with respect to voltage supply and signals (see FIG. 6) so that ten individual connectors for signals and ten individual connectors for voltage are present.

FIG. 7 shows such an individual cable 27 on an enlarged scale, comprising nine fibers 30 and being designed as a coaxial cable that simultaneously serves the transmission of the corresponding voltage.

Hence, it is possible according to the invention to feed several production apparatuses or production trees by taking minimal efforts only by way of one converter unit 2, and a corresponding control unit 3 to 10 is assigned to every production apparatus as a rule. Especially the saving aspect with respect to cable connections that are no longer needed is important according to the invention, and it is particularly possible to control and regulate each of the production trees in real time on site, and safety monitoring can be realized through the exchange of corresponding data. This is also accomplished with a minimal number of units; see e.g. a converter unit 2 connected to eight control units. The corresponding control unit serves on site in the production apparatus for distributing power and the corresponding control data or signals.

While the invention may be susceptible to various modifications and alternative forms, specific embodiments have been shown by way of example in the drawings and have been described in detail herein. However, it should be understood that the invention is not intended to be limited to the particular forms disclosed. The invention is to cover all modifications, equivalents, and alternatives falling within the spirit and scope of the invention as defined by the following appended claims. Additionally, usage of the term "present invention" or "invention" generally refers to exemplary embodiments of the claimed invention and, as such, subsequent descriptors are not necessarily requirements for every embodiment encompassed by the claims of this application.

The invention claimed is:

1. A power and signal distribution system comprising a converter unit connected to a plurality of control units arranged in areas difficult to access
   wherein the converter unit is connected to a remote monitoring and supplying device via at least one cable connection,
   wherein each control unit has assigned thereto at least one production tree for crude oil or natural gas with corresponding gate valves, chokes, and actuators,
wherein the converter unit comprises a data separation device and a voltage converter, wherein converted voltage from the voltage converter is transmitted together with data/signals from the converter unit to at least one of the control units.

2. The power and signal distribution system according to claim 1, wherein at least some of the control units are arranged one after the other relative to the converter unit for power supply and are connected via .a data bus connection for communication.

3. The power and signal distribution system according to claim 2,
   wherein said power supply and data bus connection are integrated into a cable.

4. The power and signal distribution system according to claim 2,
   wherein each control units (is individually addressable via the data bus connection.

5. The power and signal distribution system according to claim 1,
   wherein the voltage converter converts a few kV to a few 100 V.

6. The power and signal distribution system according to claim 2,
   wherein the data bus connection is a field bus, particularly a Can bus.

7. The power and signal distribution system according to claim 1,
   wherein the distance between the control units amounts up to a few kilometers, depending on a data transmission amount to each unit.

8. The power and signal distribution system according to claim 1,
   wherein the control units are redundantly arranged in at least two groups.

9. The power and signal distribution system according to claim 1,
   wherein the cable connection between monitoring and supplying device and the converter unit is a coaxial cable.

10. The power and signal distribution system according to claim 1,
    wherein a plurality of the control units are connected in parallel with the converter unit.

11. The power and signal distribution system according to claim 1,
    wherein the converter unit comprises a router for selectively distributing data/signals to each of the control units.

12. The power and signal distribution system according to claim 1,
    wherein the at least one cable connection comprises a plurality of power cable connections and signal cable connections.

13. The power and signal distribution system according to claim 12,
    wherein each signal cable connection is a fiber cable.

14. The power and signal distribution system according to claim 11,
    wherein a fiber optic modem is assigned to the router.

15. The power and signal distribution system according to claim 1,
    wherein the converter unit comprises a power feeding device for additional voltage supply.

16. The power and signal distribution system according to claim 14,
    wherein the converter unit comprises a power controller.

17. The power and signal distribution system according to claim 16,
    wherein an EMC module is assigned to the router, the modem and/or the power controller.

18. The power and signal distribution system according to claim 13,
    wherein the fiber cable comprises a plurality of single fiber cables.

19. The power and signal distribution system according to claim 1,
    wherein the cable connection comprises a cable connector with separate individual connectors for each of a plurality of single fiber cables and each of a plurality of power cable connections.

20. The power and signal distribution system according to claim 1,
    wherein at least one substitute single fiber cable is provided in the cable connection.

* * * * *